(12) United States Patent
Zagajac et al.

(10) Patent No.: US 11,544,868 B2
(45) Date of Patent: Jan. 3, 2023

(54) OBJECT LOCATION COORDINATE DETERMINATION

(71) Applicant: Ford Global Technologies, LLC, Dearborn, MI (US)

(72) Inventors: Jovan Milivoje Zagajac, Ann Arbor, MI (US); Ivan Vukovic, Arlington Heights, IL (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 292 days.

(21) Appl. No.: 16/764,897

(22) PCT Filed: Nov. 21, 2017

(86) PCT No.: PCT/US2017/062725
§ 371 (c)(1),
(2) Date: May 18, 2020

(87) PCT Pub. No.: WO2019/103721
PCT Pub. Date: May 31, 2019

(65) Prior Publication Data
US 2020/0342620 A1  Oct. 29, 2020

(51) Int. Cl.
*G06T 7/73* (2017.01)
*G06T 7/20* (2017.01)
(Continued)

(52) U.S. Cl.
CPC ............. *G06T 7/73* (2017.01); *G05D 1/0246* (2013.01); *G06T 7/20* (2013.01); *G06T 7/60* (2013.01);
(Continued)

(58) Field of Classification Search
CPC .... G06T 7/73; G06T 7/20; G06T 7/60; G06T 2207/30236; G06T 2207/30241;
(Continued)

(56) References Cited

U.S. PATENT DOCUMENTS 6,995,792 B1  2/2006 Ogura
7,117,090 B2  10/2006 Haider
(Continued)

FOREIGN PATENT DOCUMENTS

| JP | 2000113396 A | 4/2000 |
|---|---|---|
| KR | 101354049 B1 | 2/2014 |
| KR | 1020170047143 A | 5/2017 |

OTHER PUBLICATIONS

Hernandez-Javo et al., "V-Alert: Description and Validation of a Vulnerable Road User Alert System in the Framework of a Smart City", Sensors (Basel). Aug. 2015; 15(8): 18480-18505. Published online Jul. 29, 2015. doi: 10.3390/s150818480, https://www.ncbi.nlm.nih.gov/pmc/articles/PMC4570332/.
(Continued)

*Primary Examiner* — Jae N Noh
(74) *Attorney, Agent, or Firm* — Brandon Hicks; Bejin Bieneman PLC

(57) ABSTRACT

A system includes a processor and a memory. The memory stores instructions executable by the processor to receive an image from a stationary camera. The memory stores instructions to determine location coordinates of an object identified in the image based on location coordinates specified for the image. The memory stores instructions to operate a vehicle based on the object location coordinates.

14 Claims, 5 Drawing Sheets

(51) Int. Cl.
*G06V 20/54* (2022.01)
*G05D 1/02* (2020.01)
*G06T 7/60* (2017.01)
*G08G 1/16* (2006.01)
*G01S 19/42* (2010.01)

(52) U.S. Cl.
CPC .............. *G06V 20/54* (2022.01); *G08G 1/164* (2013.01); *G01S 19/42* (2013.01); *G05D 2201/0213* (2013.01); *G06T 2207/30236* (2013.01); *G06T 2207/30241* (2013.01); *G06T 2207/30252* (2013.01)

(58) Field of Classification Search
CPC .......... G06T 2207/30252; G06V 20/54; G05D 1/0246; G05D 2201/0213; G08G 1/164; G01S 19/42
See application file for complete search history.

(56) References Cited

U.S. PATENT DOCUMENTS

| | | | |
|---|---|---|---|
| 7,202,776 B2 | 4/2007 | Breed | |
| 7,994,902 B2 | 8/2011 | Avery et al. | |
| 8,605,947 B2 | 12/2013 | Zhang et al. | |
| 8,903,640 B2 | 12/2014 | Caminiti et al. | |
| 9,092,984 B2 | 7/2015 | Bahl et al. | |
| 2014/0070934 A1 | 3/2014 | Chau et al. | |
| 2015/0002311 A1 | 1/2015 | Spiess | |
| 2016/0343256 A1 | 11/2016 | Song et al. | |
| 2017/0016740 A1 | 1/2017 | Cui et al. | |
| 2017/0177937 A1 | 6/2017 | Harmsen et al. | |
| 2018/0307238 A1* | 10/2018 | Wisniowski | G05D 1/0246 |
| 2018/0341812 A1* | 11/2018 | Floor | G06V 20/52 |
| 2020/0103920 A1* | 4/2020 | Castorena Martinez | G08G 1/166 |

OTHER PUBLICATIONS

Russ et al., "V2X-based cooperative protection system for vulnerable road users and its impact on traffic", Conference: 23rd World Congress on Intelligent Transport Systems, At Melbourne, Australia, Oct. 2016, https://www.researchgate.net/publication/311808386_V2X-based_cooperative_protection_system_for_vulnerable_road_users_and_its_impact_on_traffic.

International Search Report of the International Searching Authority for PCT/US2017/062725 dated Feb. 2, 2018.

* cited by examiner

OBJECT LOCATION COORDINATE DETERMINATION

BACKGROUND

Vehicle collision avoidance systems can use vehicle sensor data and/or broadcast messages from other vehicles to identify an object that is a collision risk and to determine a location of an identified object. However, it is a problem that certain objects can be difficult to identify and/or do not broadcast messages from which a collision risk can be identified. Further, it is a problem that present collision avoidance techniques rely on technologies that are typically expensive and/or difficult to implement. Therefore, it would be beneficial to present a new technical solution for identifying collision risk objects for a vehicle that effectively and efficiently provides collision avoidance for objects that present technologies do not adequately address.

DETAILED DESCRIPTION

Introduction

Figure 1:
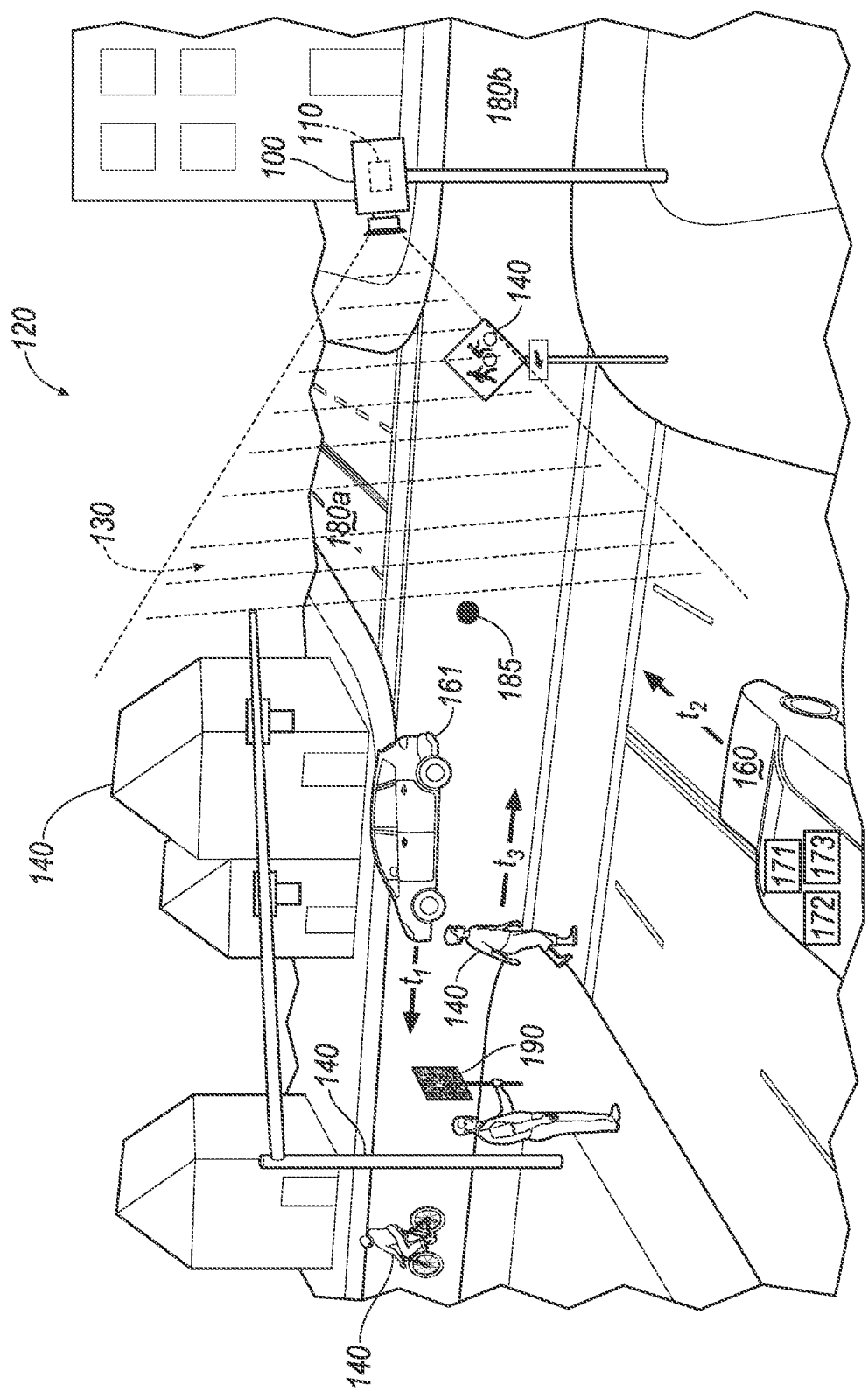
FIG. 1 is a diagram of an exemplary camera directed to an example intersection.

Disclosed herein is a system including a processor and a memory. The memory stores instructions executable by the processor to receive an image from a stationary camera. The memory stores instructions executable by the processor to determine location coordinates of an object identified in the image based on location coordinates specified for the image, and to operate a vehicle based on the object location coordinates.

The instructions may further include instructions to determine the object location coordinates based on stored location coordinates of each of a plurality of reference points in the image.

The instructions may further include instructions to determine the object location coordinates by identifying one or more projection points in the image associated with the object, and to determine the object location coordinates based on the stored location coordinates.

The location coordinates specified for the image may be associated with a visual feature in the received image that is one of a road intersection, a building, a traffic sign, and a calibration sign.

The instructions may further include instructions to receive geometrical properties of the visual feature and location coordinates of the visual feature, to detect the visual feature in the received camera image based on the received geometrical properties, and to specify location coordinates for the image by associating the received location coordinates to a projection point of the visual feature in the received image.

The calibration sign may be a portable sign and the calibration sign may further include a GPS sensor and a processor programmed to transmit the location coordinates of the calibration sign based on data received from the GPS sensor of the calibration sign.

The instructions may further include instructions to adjust the predetermined location coordinates of the reference location upon determining that a projection point in the image associated with a reference location has moved, and to determine the object location coordinates based on the adjusted location coordinates of the reference location.

The instructions may further include instructions to determine the location coordinates specified for the image based on a camera location and an orientation of the camera.

The instructions may further include instructions to determine at least one of a trajectory and a speed of the object based on the received camera image.

The instructions may further include instructions to perform the vehicle operation by actuating a vehicle brake actuator based on the location coordinates of the detected object and a trajectory of the vehicle.

Further disclosed herein is a method including receiving an image from a stationary camera, determining location coordinates of an object identified in the image based on location coordinates specified for the image, and operating a vehicle based on the object location coordinates.

The method may further include determining the object location coordinates based on stored location coordinates of each of a plurality of reference points in the image.

The method may further include determining the object location coordinates by identifying one or more projection points in the image associated with the object, and determining the object location coordinates based on the stored location coordinates.

The location coordinates specified for the image may be associated with a visual feature in the received image that is one of a road intersection, a building, a traffic sign, and a calibration sign.

The method may further include receiving geometrical properties of the visual feature and location coordinates of the visual feature, detecting the visual feature in the received camera image based on the received geometrical properties, and specifying location coordinates for the image by associating the received location coordinates to a projection point of the visual feature in the received image.

The method may further include transmitting the location coordinates of the calibration sign based on data received a GPS sensor included the calibration sign, wherein the calibration sign is a portable sign.

The method may further include adjusting the predetermined location coordinates of the reference location upon determining that a projection point in the image associated with a reference location has moved, and determining the object location coordinates based on the adjusted location coordinates of the reference location.

The method may further include determining the location coordinates specified for the image based on a camera location and an orientation of the camera.

The method may further include determining at least one of a trajectory and a speed of the object based on the received camera image.

The method may further include performing the vehicle operation by actuating a vehicle brake actuator based on the location coordinates of the detected object and a trajectory of the vehicle.

Further disclosed is a computing device programmed to execute the any of the above method steps.

Yet further disclosed is a computer program product, comprising a computer readable medium storing instructions executable by a computer processor, to execute any of the above method steps.

System Elements

FIG. 1 illustrates a camera 100, with a field of view 130, directed to an example area including an intersection 120. The camera 100 is an electronic vision sensor providing image data of the field of view 130 of the camera 100. The camera 100 may include a visual image sensor or a combination of a visual and an infrared image sensor. The image data, i.e., digital data storable in a memory in a predetermined format, e.g., can include pixels along with specified values relating to image attributes such as color, light intensity, etc., for each pixel. In one example, the processor 110 may generate image data, e.g., an image 200 (see FIG. 2) including a visual representation of the field of view 130, e.g., encompassing the intersection 120 of roads 180a, 180b, a host vehicle 160, target objects such as building(s), pedestrian(s), traffic lights signs, etc. (referred to collectively herein as objects 140) and/or an object vehicle 161. In an example illustrated in FIG. 1, the camera 100 is directed to a center 185 of the intersection 120. The camera 100 may be mounted in various locations such as a parking lot, pedestrian crossing, airports, etc., typically oriented in a predetermined direction, i.e., an axis parallel to and through the camera 100 lens 230 (see FIG. 2) is at a specified height from the ground, and oriented with respect to each of a vertical axis and two horizontal axes (e.g., determined with relation to maps directions such as north, south, west, east) to gather images 200 in a specified field of view 130.

The camera 100 is typically a conventional digital camera, e.g., may include a processor 110, image sensors, and optical components. The camera 100 may output image data based on optical signals (i.e., light) detected by the image sensor(s). The processor 110 may be programmed to detect objects in the received image 200 and determine location coordinates, speed, etc., of an object, e.g., the vehicle 160, in the received image 200, as discussed below with reference to FIGS. 2-3.

The vehicles 160, 161 may be powered in variety of known ways, e.g., with an electric motor and/or internal combustion engine. The vehicles 160, 161 may have common elements including a computer 171, actuators 172, sensors 173, etc., as discussed herein below. A host vehicle 160 and object vehicle(s) 161 are referred to distinctly herein to capture the distinction between a host vehicle 160 with relative to which collision risk is evaluated and avoided as disclosed herein, and one or more object vehicles 161, which are discussed as target objects along with other target objects 140 with respect to which collision risk may be evaluated and avoided for the host vehicle 160.

The computer 171 includes a processor and a memory such as are known. The memory includes one or more forms of computer-readable media, and stores instructions executable by the computer for performing various operations, including as disclosed herein. The computer 171 may operate the vehicle 160, 161 in an autonomous, semi-autonomous, or non-autonomous mode. For purposes of this disclosure, an autonomous mode is defined as one in which each of vehicle 160, 161 propulsion, braking, and steering are controlled by the computer; in a semi-autonomous mode, the computer controls one or two of vehicle 160, 161 propulsion, braking, and steering; in a non-autonomous mode, a human operator controls the vehicle 160, 161 propulsion, braking, and steering.

The computer 171 may include programming to operate one or more of brakes, propulsion (e.g., control of acceleration in the vehicle 160, 161 by controlling one or more of an internal combustion engine, electric motor, hybrid engine, etc.), steering, climate control, interior and/or exterior lights, etc.

The vehicles 160, 161 may include one or more sensors, e.g., camera, radar, global positioning system (GPS) device, etc. For example, the computer 171 may be programmed to broadcast the vehicle 160, 161 location coordinates based on data received from the GPS sensor included in the vehicle 160, 161. For example, the computer 171 may be programmed to actuate a vehicle 161 brake actuator 172 upon determining based on the received location coordinates of the vehicle 160 that a distance between the vehicles 160, 161 is less than a predetermined threshold, e.g., 10 meters.

The vehicles 160, 161 may include actuator(s) 172 that are implemented via circuits, chips, or other electronic components that can actuate various vehicle subsystems in accordance with appropriate control signals as is known. The actuators 172 may be used to control braking, acceleration, and steering of the vehicle 160, 161.

The computer of the vehicle 160, 161 may include or be communicatively coupled to, e.g., via a vehicle network such as a communications bus as described further below, more than one processor, e.g., controllers or the like included in the vehicle for monitoring and/or controlling various vehicle controllers, e.g., a powertrain controller, a brake controller, a steering controller, etc. The computer 171 is generally arranged for communications on a vehicle communication network such as a bus in the vehicle such as a controller area network (CAN) or the like.

In addition, the computer 171 may be programmed to communicate through a wireless communication network with the vehicles 161, mobile devices, the camera 100, and/or devices such as a traffic light, etc., via a wireless communication network. The wireless communication network, which may include a Vehicle-to-Vehicle (V-to-V) and/or a Vehicle-to-Infrastructure (V-to-I) communication network, includes one or more structures by which the vehicles 160, 161, the camera 100, a mobile device, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), Cellular V2X, and/or wide area networks (WAN), including the Internet, providing data communication services.

Figure 2:
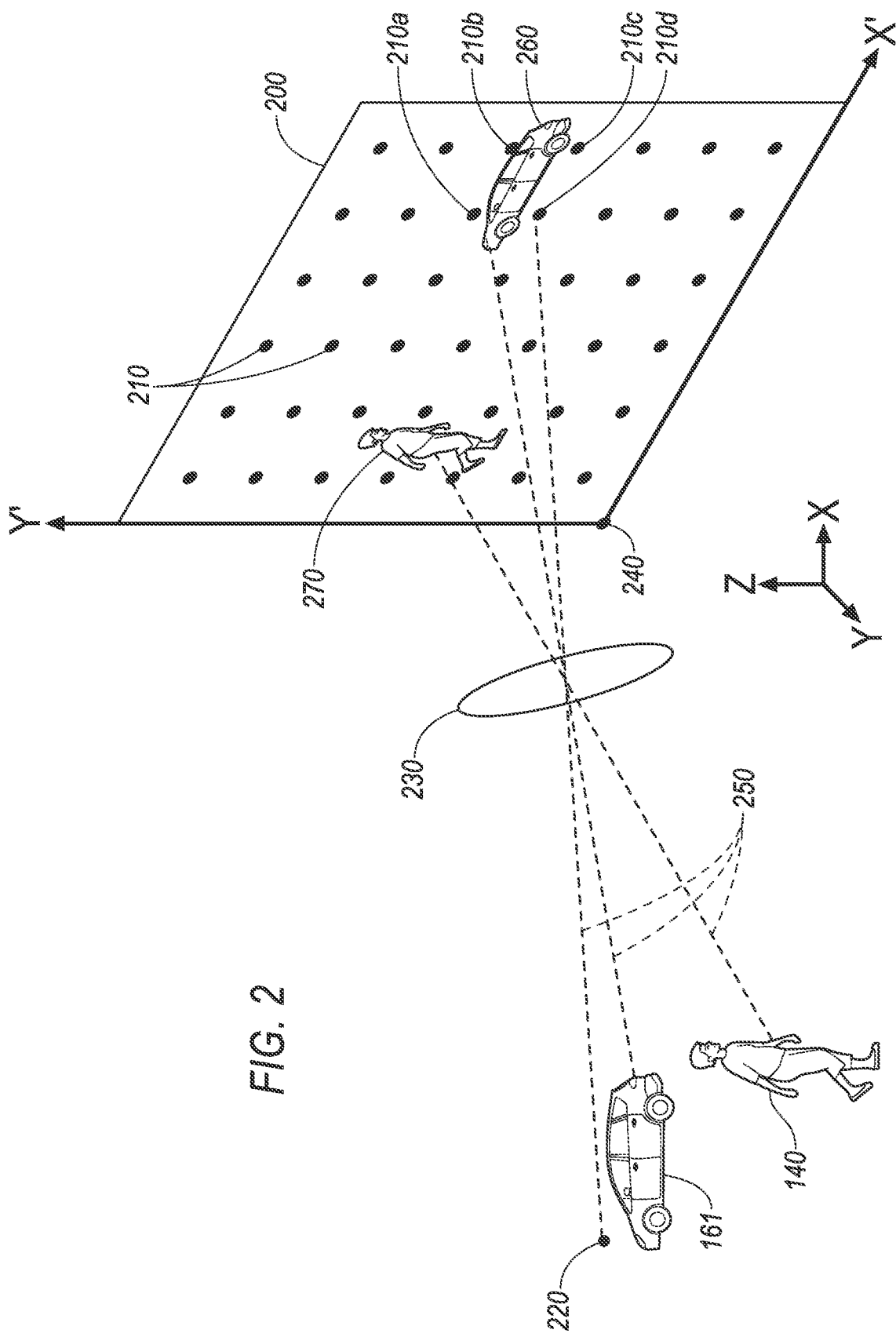
FIG. 2 shows example stored location coordinates superimposed on an example camera image.

The computer 171 may actuate the vehicle 160, 161 based on location and/or direction of movement of other objects such as the pedestrian object 140, other vehicles 160, 161, bicycles, etc. For example, e.g., by actuating a vehicle 160, 161 brake actuator 172 to brake. The computer 171 may be programmed to receive the location coordinates such as global positioning system (GPS) coordinates from another vehicle 161, etc. However, some objects 140 such as the pedestrian object 140, a bicycle, etc., may lack a device with a GPS sensor that transmits their location. With reference to FIGS. 1-2, the processor 110 and/or a host vehicle 160 computer 171 may be programmed to receive an image 200 from a stationary camera 100. The processor 110 may determine location coordinates of an object 140, e.g., the pedestrian object 140, the object vehicle 161, etc., identified in the image 200, based on location coordinates specified for the image 200. In one example, the vehicle 160 computer 171 may be further programmed to operate the vehicle 160 based on the determined location coordinates of the object 140.

"Stationary" is intended herein to have its plain and ordinary meaning, i.e., non-moving or fixed at a location, e.g., on a pole. Thus, the field of view 130 of a stationary camera 100 typically does not change after the camera 100 has been installed, e.g., at the intersection 120, unless the location and/or orientation of the stationary camera 100 are changed, e.g., by a technician, relative to the surrounding environment.

"Location coordinates" in this disclosure mean coordinates, e.g., GPS location coordinates, specifying a location on a ground surface. For example, the location coordinates can be determined in a reference multi-dimensional Cartesian coordinate system having a predetermined origin point, e.g., on a ground surface. For example, the location coordinates may include X, Y, Z coordinates. X, Y, and Z may represent, respectively, longitudinal, lateral, and height coordinates of the location. Specifying location coordinates for an image means that the location coordinates are specified for the locations included in the image 200 received at the stationary camera 100. Specifying location coordinates for the image is discussed in more detail with reference to FIG. 2.

The processor 110 may be programmed to perform a vehicle 160 operation such as steering, braking, and/or propulsion, by actuating a vehicle 160 brake actuator 172 based on the location coordinates of the detected object 140, e.g., the object vehicle 161, and a trajectory $t_1$ of the object vehicle 161.

A trajectory, e.g., a trajectory $t_1$, $t_2$, $t_3$, in the context of present disclosure refers to an actual, expected, and/or projected movement path of an object such as the object vehicle 161, the pedestrian object 140, a bicycle object 140, etc., starting from a current location of the object 140 and extending for at least a predetermined distance, e.g., 5 meters, ahead of the object 140. The host vehicle 160 computer 171 may be programmed to actuate a host vehicle 160 actuator 172 to navigate the host vehicle 160 based on the determined trajectories, e.g., by accelerating, braking, and/or steering. The respective trajectories of detected objects 140 may include curves and/or straight lines on a ground surface, e.g., a road 180a, 180b, sidewalk, etc.

The processor 110 may be programmed to determine a trajectory and/or a speed of the object based 140 on the received camera 100 image 200. For example, the processor 110 may be programmed to determine a trajectory of the object 140 by periodically determining the location of the object 140 to plot the actual trajectory of the object 140. An expected or projected trajectory can then be determined using extrapolation techniques, based on the plotted actual, e.g., historical to a present moment, trajectory.

The processor 110 may be programmed to classify the object 140 based on a risk level and to perform a vehicle 160 operation based on a risk level associated with an identified class of the object. A risk level is an assigned value on a predetermined scale, e.g., from one to ten, or "high," medium," and "low," etc. A risk level indicates a risk of causing a damage to a human and/or the vehicle 160. As shown in an example Table 1, a human and/or large object, e.g., a building, may be assigned a higher risk level because a collision with such an object 140 may cause more damage to the vehicle 160 and/or a human than an object with a low risk level, such as a pothole or bump in a road. The vehicle 160 computer 171 may be programmed to cause an action, e.g., steering, accelerating, and/or braking to prevent a collision with an object 140 based on an action associated with the determined risk level, e.g., as shown in Table 1.

TABLE 1

| Object | Risk class of the object | Action |
|---|---|---|
| Animal, building, boulder, pedestrian, tree | High risk class | Steering operation; Braking with no deceleration threshold |
| Traffic sign | Medium risk class | Braking operation with deceleration threshold - 0.8 g |
| Traffic cone | Low risk class | Braking operation with deceleration threshold - 0.5 g |

In one example, shown in FIG. 2, location coordinates of various points, herein referred to as reference points 210, within the field of view 130 of the stationary camera 100, may be specified. Although FIG. 2 shows uniformly distributed reference points 210 for ease of illustration, the reference points 210 may be distributed in any other form, e.g., some or all could be arbitrarily or randomly distributed. The processor 110 may be programmed to determine the location coordinates of, e.g., the object vehicle 161, the pedestrian object 140, etc., based on stored location coordinates of each of plotted reference points 210 in the image 200. The location coordinates of the reference points 210 may be stored in a processor 110 memory, e.g., as represented in Table 2. Herein, the term "reference point" refers to a point, e.g., a pixel, in the received image 200 that can be specified by height and width coordinates in the image 200, e.g., in a Cartesian two-dimensional coordinate system having a predetermined origin point such as a corner point 240. Location coordinates of a point, e.g., the reference point 210d, include X', Y' coordinates of the point relative to the origin point such that the corner point 240. X' and Y' may represent, respectively, longitudinal, lateral coordinates of the point in the image 200 location. A "reference location" in the present context refers to a point on ground surface, e.g., road, sidewalk, building, objects, etc. A reference location 220 may be projected on a reference point 210d (or area) in the received image 200. For a reference location 220 to correspond to or project to a point 210d means that a line 250 through the reference point 210d and the camera 100 lens 230 also includes the reference location 220 (and vice versa). For example, a projection of the object vehicle 161 is a projection area 260 in the image 200. As another example, a projection of the pedestrian object 140 is an object projection area 270.

TABLE 2

| Reference point projection location in the image (Pixels) | GPS location coordinate (Decimal degrees) of the reference location |
|---|---|
| 100, 200 | 41.40338, 2.17403 |
| 567, 600 | 41.31247, 2.2540 |
| 800, 800 | 41.53468, 2.1431 |

The processor 110 may be programmed to detect an object 140 (e.g., the pedestrian object 140, the object vehicle 161, etc.) in an image 200 and determine object 140 location coordinates by identifying one or more projection points, e.g., the projection areas 260, 270, in the image 200 associated with the detected object 140. The processor 110 may be further programmed to determine the object vehicle 161 location coordinates based on the stored location coordinates, e.g., of multiple reference points 210, by consulting stored data such as shown in FIG. 1. The processor 110 may be programmed to identify three or more reference points 210a, 210b, 210c, 210d adjacent or overlapping the projection area 260 of the vehicle 160 in the image and determine the vehicle 160 location coordinates using triangulation, trilateration, and/or interpolation techniques based on the identified reference points 210 adjacent the projection area 260. In this context, overlapping means the reference point 210 is on a projection area 260 of the object vehicle 161; an adjacent means that the reference point 210 is nearer to the projection area 260 than any other reference point 210. In one example, the processor 110 may be programmed to determine location coordinates of each or a selected set of the image 200 data points, e.g., each pixel, based on the stored location coordinates, e.g., Table 2, and store the location coordinates associated with each of the image 200 pixels in the processor 110 memory. For example, 5 (five) reference points 210 are stored and the processor 110 determines respective reference locations associated with each pixel of the image 200 based on the five stored location coordinates. In this example, because the location coordinates of each pixel or a selected set of the pixels in the image 200 is determined, the processor 110 may be programmed to look up the location coordinates of the detected object 140.

As discussed above, the location coordinates of multiple reference points 210 may be stored in, e.g., the camera 100 memory. Various example techniques for determining the location coordinates of the reference points 210 are described below with reference to FIG. 3. In this context, determining the location coordinates of the reference points 210 is may be referred to as a "calibration."

Figure 3:
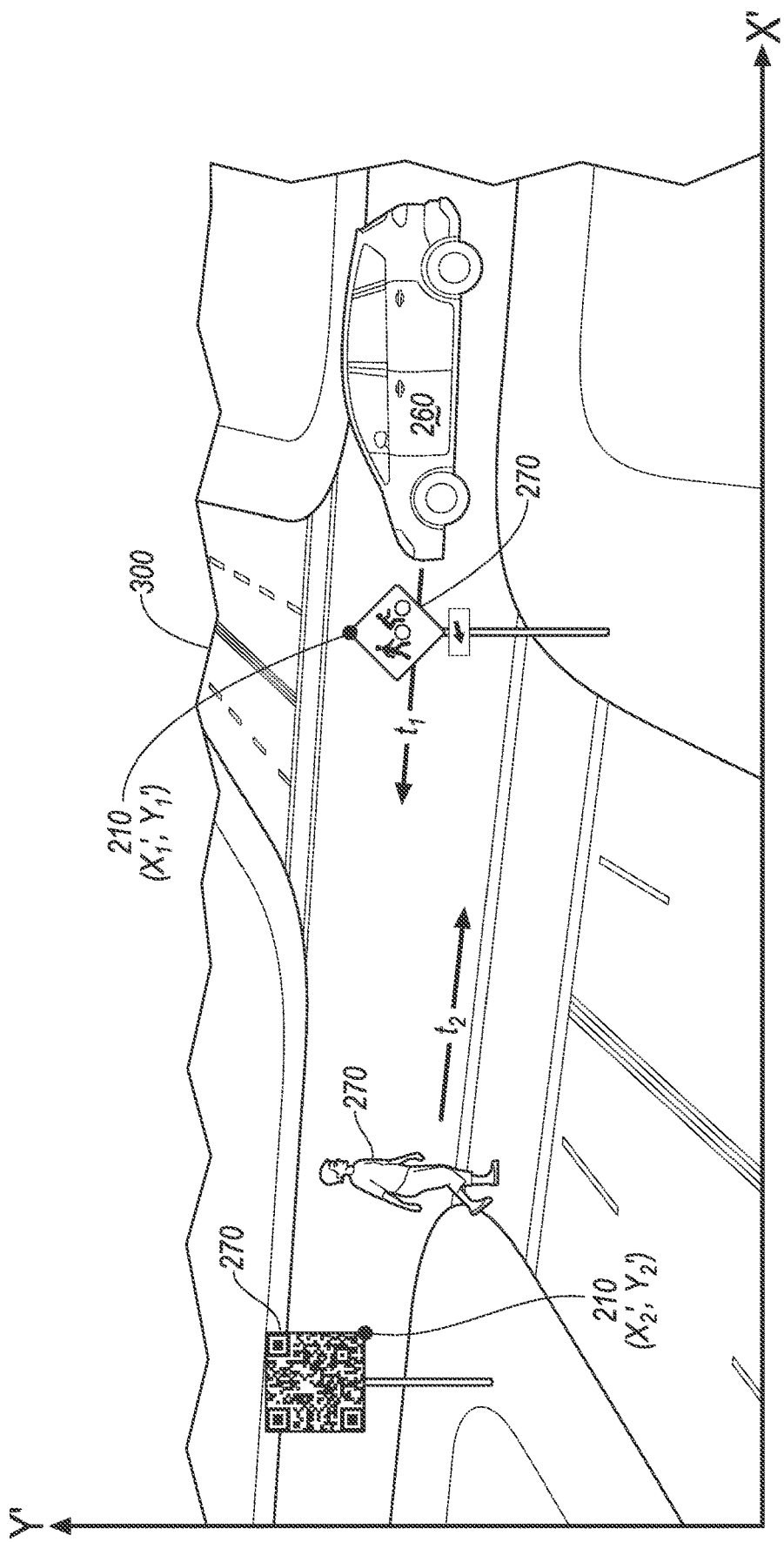
FIG. 3 is an example image received at the camera of FIG. 1.

FIG. 3 shows an example image 300 received at a camera 100 installed at an intersection 120. In order to calibrate the camera 100, i.e., to determine the location coordinates of the reference points 210 in the image 300, the processor 110 may be programmed to associate a reference point 210 in the image 300 to location coordinates of a reference location projected on the respective reference point 210. In one example, the reference location may be associated with a visual feature in the received image 300, e.g., the object 140, a calibration sign 190, etc. In other words, by detecting visual feature such as the traffic sign object 140 in the received image 300, the reference point(s) 210 in the image 300 may be determined (i.e., the points within the projection areas 260, 270 of the visual feature) and can be associated to, e.g., GPS location coordinates of, e.g., the object 140, the object vehicle 161, etc.

The processor 110 may be programmed to receive, e.g., from a remote computer, a processor 110 memory, etc., geometrical properties of the visual feature and location coordinates of the visual feature, e.g., the traffic sign object 140, to detect the visual feature in the received image 300 based on the received geometrical properties. The geometrical properties may include information such as dimensions, shape, pattern, etc., of the object 140, road 180a, 180b, etc. The processor 110 may be programmed to store the received location coordinates as the specified location coordinates for the image 300 by associating the received location coordinates to, e.g., a projection area 260, 270, location of the visual feature in the received image 300. The processor 110 may be programmed to receive the geometrical properties of a visual feature, e.g., from a remote computer, and to detect the visual feature, e.g., the bicycle object 140, in the received image 300. Additionally or alternatively, the processor 110 may be programmed to store the geometrical properties of the visual feature in the processor 110 memory.

The processor 110 can then determine a reference point, e.g., a center, corner, peak, etc., of the projection area 260, 270 in the image 300, e.g., a peak of the projection area 270. The "peak" refers to a highest point of an object from the ground surface. The processor 110 may then determine the reference point 210 with coordinates $(X_1', Y_1')$ of, e.g., the peak of the traffic sign object 140, in the image 300. The processor 110 may associate the determined reference point $(X_1', Y_1')$ of the image 300 to the received GPS reference location $(X_1, Y_1, Z_1)$ of the traffic sign object 140. $X_1'$ and $Y_1'$ represent location in the image 300, e.g., in pixels unit, whereas $X_1$, $Y_1$, and $Z_1$ are location coordinates in the three-dimensional Cartesian system. Thus, the processor 110 may store the location coordinates $(X_1, Y_1, Z_1)$ and the reference point $(X_1', Y_1')$, e.g., in form a table such as Table 2. Additionally or alternatively, the GPS location coordinate system may be used to determine the locations on the ground surface, etc., in which a location can be determined with a pair of numbers specifying a coordinate, e.g., latitude and longitude.

Another example technique for calibration of the camera 100 reference locations may include using a calibration sign 190 (see FIG. 1). The calibration sign 190 may be a portable sign and the calibration sign 190 may further include a GPS sensor and a computing device with a processor and memory. The calibration sign 190 processor may be programmed to transmit, e.g., via a wireless communication network, the location coordinates of the calibration sign 190 based on data received from the GPS sensor of the calibration sign 190. The calibration sign 190 may have a specific visual feature such as a printed pattern. For example, the processor 110 may be programmed to detect, e.g., a bottom corner of, the calibration sign projection area 270 in the image 300 at a reference point $(X_2', Y_2')$ and receive the location coordinates $(X_2, Y_2, Z_2)$ of the calibration sign 190 via the wireless communication network. Thus, advantageously, by moving the calibration sign 190 to multiple locations within the field of view 130 of the camera 100, three of more reference points 210 can be determined.

As another example technique for calibration of the camera 100, the processor 110 may be programmed to determine the location coordinates specified for the image 300 based on the camera 100 location and an orientation of the camera 100. For example, the processor 110 may be programmed to receive the location and orientation of the camera 100 from, e.g., a remote computer and/or one or more internal sensors included in the camera 100 housing, etc. The processor 110 may be programmed to determine location coordinates of one or more locations within the field of view 130 of the camera 100 based on the received camera 100 location, camera 100 orientation, and/or camera 100 optical properties. The optical properties may include focal point, the field of view 130, distortion characteristics of the camera 100 lens 230, etc.

As discussed above, the camera 100 is stationary, however because of various reasons such as wear and tear, wind, etc., an orientation and/or a location of the camera 100 may change. The processor 110 may be programmed to adjust the predetermined location coordinates of the reference location 220, upon determining that a reference point 210 in the image 200, 300 associated with the reference location has moved. "Movement" in this context means a change of location 220 relative to the location and/or orientation of the camera 100 at a time of calibration, i.e., determining location coordinates of the reference points 210 in the images 200, 300 received by the camera 100. The processor 110 may be further programmed to determine the object 140 location coordinates based on the adjusted location coordinates of the reference location.

As one example, the processor 110 may be programmed to store information of a visual feature, e.g., the traffic sign object 140, as a reference location 220 and to associate it to the projection area 270 of the traffic sign object 140 as the reference point 210. As long as the camera 100 is stationary and the traffic sign 140 is not uninstalled and/or moved, the projection area 270 in the image 300 may not move. Thus, the processor 110 may be programmed to determine whether the camera 100 has moved by comparing current projection area 270 of the visual feature to the stored projection area 270. The processor 110 may store visual feature data such as geometrical properties information of the traffic sign 140. Additionally, the processor 110 may be programmed to associate the stored visual feature geometrical properties, e.g., shape, dimensions, etc., to the reference point 210. The processor 110 may be programmed to, e.g., periodically, detect the traffic sign object 140 in the received image 300 based on the stored visual feature data and to determine the location of the projection area 270 of the visual feature in the image 300. The processor 110 may be programmed to adjust the reference location upon determining that, e.g., the peak point of the traffic sign projection area 270 has moved more than a specified distance, e.g., one pixel, away from the stored location. The processor 110 may be programmed to adjust the stored location coordinates of the reference location 220 and/or reference point 210, e.g., in a set of data such as illustrated in Table 2 above, based on the moved locations of the reference points 210 in the image 300, e.g., using triangulation techniques.

Additionally or alternatively, the processor 110 may be programmed to determine (and store) adjusted reference locations and/or the reference points 210 based on a detected vehicle 160 and received location coordinates of the detected vehicle 161. In other words, the vehicle 160 computer 171 may be programmed to determine the vehicle 160 location based on data received from a vehicle 160 GPS sensor 173 and broadcast the vehicle 160 location coordinates. The processor 110 may be programmed to determine the location coordinates of the vehicle 160 in the received image 200 and store the location of the vehicle 160 in the image 200 and the associated GPS location coordinates, e.g., received via the wireless communication network from the vehicle 160.

In another example, two or more cameras 100 may be installed in an area. As one example, a first and a second camera 100 may be installed at the intersection 120 of FIG. 1, e.g., each observing a portion of the intersection 120 (not shown). The fields of view 130 of the cameras 100 may overlap. In one example, the processor 110 of the first camera 100 may receive image data from the second camera 100 and determine location, speed, and/or trajectory of a detected object 140 based on image data received from the first and second camera 100. As discussed above, the processor 110 may be programmed to project a trajectory $t_1$ of the vehicle 160, based on multiple images including images of the vehicle 160. In this example with multiple cameras 100, when the vehicle 160 exits the field of view 130 of the first camera 100 and enters the field of view 130 of the second camera 100, the processor 110, e.g., of the second camera 100, may be programmed to determine the trajectory $t_1$ of the object vehicle 161 based on a combination of images from the first and second cameras 100.

Processing

Figure 4:
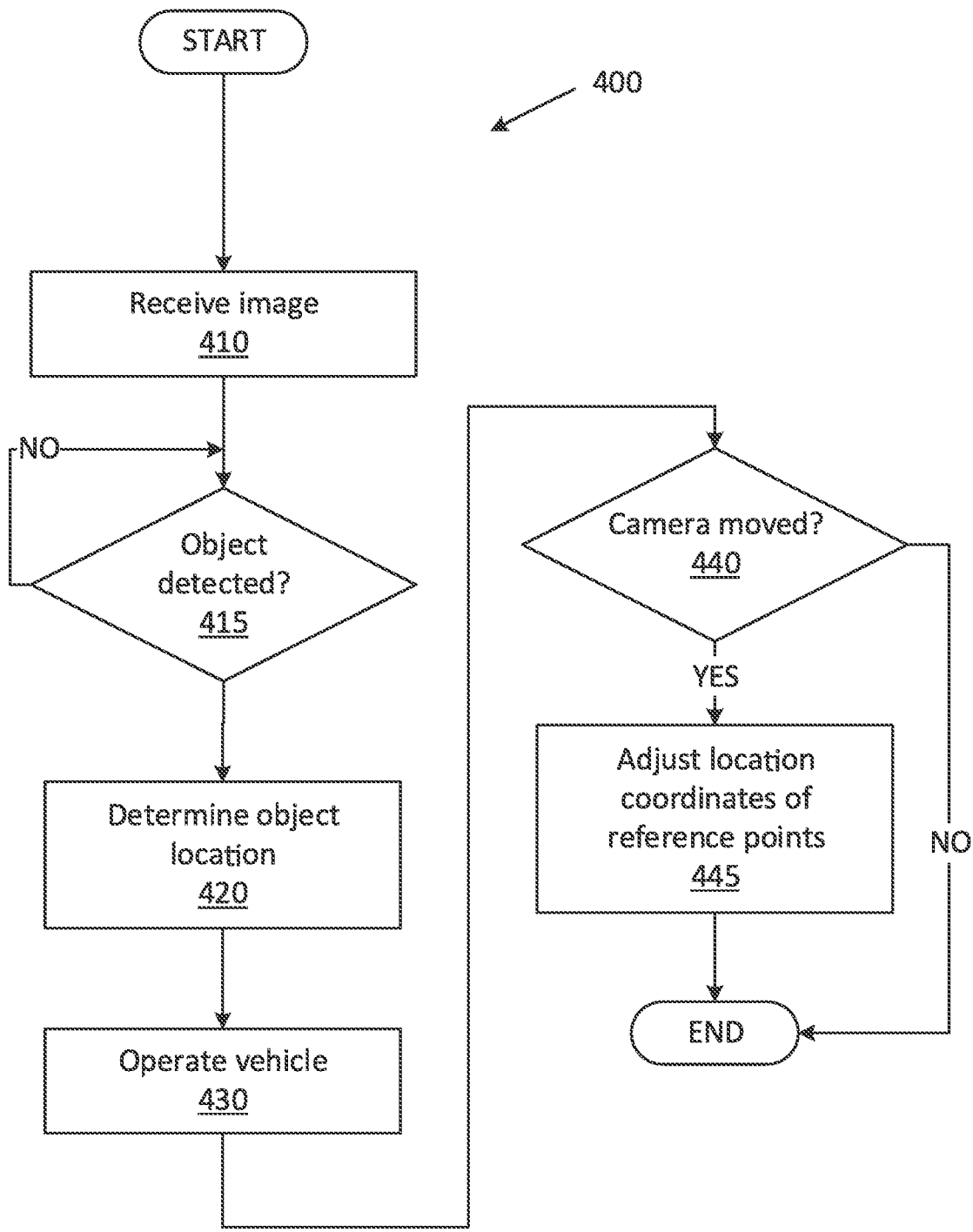
FIG. 4 is a flowchart for determining location coordinates of objects that are in a field of view of the camera.

FIG. 4 is a flowchart of an exemplary process 400 for determining location coordinates of objects 140 that are in a field of view 130 of a camera 100. For example, the processor 110 of the camera 100, a remote computer, a vehicle 160 computer 171, or a combination thereof, may be programmed to execute blocks of the process 400.

The process 400 begins in a block 410, in which the processor 110 receives image data from the camera 100.

In a decision block 415, the processor 110 determines whether an object 140, a vehicle object 161, etc., is detected. For example, the processor 110 may be programmed to detect object(s) 140 in the received image data using image processing techniques as discussed above. The processor 110 may be programmed to detect the objects 140 based at least in part on the geometrical properties of the objects 140 stored in a processor 110 memory and/or received from a remote computer. If the processor 110 determines that an object 140 is detected, then the process 400 proceeds to a block 420; otherwise the process 400 returns to the decision block 415.

In the block 420, the processor 110 determines the location coordinates of the detected object 140, e.g., a pedestrian object 140. The processor 110 may be programmed to determine the object 140 location coordinates by identifying a projection area 270 in the image 300 associated with the detected pedestrian object 140, and determine the pedestrian object 140 location coordinates based on the stored reference location coordinates. The processor 110 may be programmed to determine a speed and/or trajectory $t_3$, etc. of the detected pedestrian object 140 based on the received image data and the stored location coordinates of the reference locations. Additionally, the processor 110 may be programmed to determine a risk class of the detected object based on a risk taxonomy, e.g., Table 1.

Next, in a block 430, the processor 110 operates the vehicle 160, e.g., actuates a vehicle 160 actuator 172. In one example, the processor 110 may be programmed to execute a collision avoidance maneuver, including to perform a vehicle 160 operation by transmitting an instruction to a vehicle 160, 161 brake actuator 172 based on the location coordinates, speed, and/or trajectory $t_3$ of the detected object. In another example, the processor 110 transmits the location coordinates, speed, and/or trajectory $t_3$ of, e.g., the pedestrian object 140, to the vehicle 160. Thus, the vehicle 160 computer 171 may be programmed to perform a vehicle 160 operation based on the information received from the camera 100 processor 110. In yet another example, the processor 110 may be programmed to broadcast location coordinates, speed, and/or the trajectory of the detected object 140 via the wireless communication network. Some objects 140 may broadcast their location coordinates, e.g., the object vehicle 161. In one example, the processor 110 may be programmed to operate a vehicle 160 only upon determining based on information received via the wireless communication network that, e.g., the detected bicycle object 140 does not broadcast its location coordinates. Additionally or alternatively, the processor 110 and/or the vehicle 160 computer 171 may be programmed to operate the vehicle 160 based on the determined risk class of the object 140.

Next, in a decision block 440, the processor 110 determines whether the camera 100 has moved since the location coordinates of the reference points 210 were stored. The processor 110 may be programmed to determine that the camera 100 has moved, upon determining that at least a projection of a visual feature associated with a reference point 210 in the received image(s) has moved compared to the stored location of the projection. If the processor 110 determines that the camera 100 has moved, then the process 400 proceeds to a block 445; otherwise the process 400 ends, or alternatively returns to the decision block 405, although not shown in FIG. 4.

In the block 445, the processor 110 adjusts location coordinates of the reference points 210. The processor 110 may be programmed to determine a movement of the camera 100 and adjust the reference location (e.g., the location coordinates of the reference location 220) associated with the reference point 210 based on the determined movement of the camera 100. The processor 110 may be programmed to store the adjusted reference locations and/or the reference points 210 in, e.g., the camera 100 memory. Additionally or alternatively, the processor 110 may be programmed to store adjusted reference locations and/or the reference points 210 based on a detected vehicle 160 and received location coordinates of the detected vehicle 161.

Following the block 445, the process 400 ends, or alternatively returns to the decision block 405, although not shown in FIG. 4 for simplicity of illustration.

Figure 5:
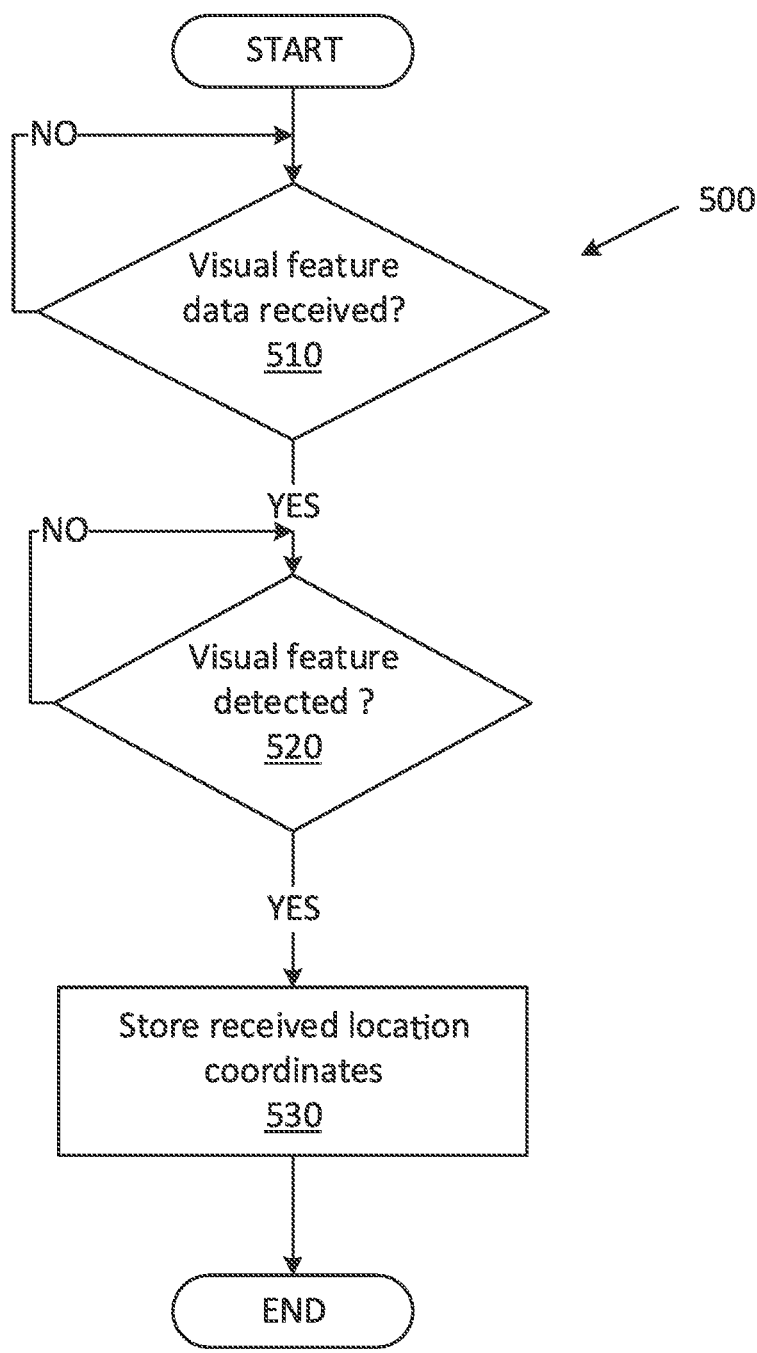
FIG. 5 is a flowchart of an exemplary process for calibrating the camera.

FIG. 5 is a flowchart of an exemplary process 500 for calibrating the camera 100. For example, the processor 110 of the camera 100 may be programmed to execute blocks of the process 500.

The process 500 begins in a decision block 510, in which the processor 110 determines whether visual feature geometrical properties was received and/or is stored. The processor 110 may be programmed to receive visual feature the geometrical properties including dimensions, shape, etc., and the location coordinates from a remote computer, e.g., via the wireless communication network. The visual feature may be a calibration sign 190, a traffic sign object 140, etc. If the processor 110 determines that visual feature data was received and/or is stored, then the process 500 proceeds to a decision block 520; otherwise the process 500 returns to the decision block 510.

In the decision block 520, the processor 110 determines whether the visual feature was detected. The processor 110 may be programmed to detect the visual feature, e.g., a calibration sign 190, based on the received visual feature geometrical properties. For example, the processor 110 may be programmed to detect the calibration sign 190 based on the received dimensions, shape, etc., of the calibration sign 190. If the processor 110 determines that the visual feature was detected, then the process 500 proceeds to a block 530; otherwise the process 500 returns to the decision block 520.

In the block 530, the processor 110 stores received location coordinates of the reference point 210. For example, the processor 110 may be programmed to store the projection area 270 and the location coordinates of the visual feature, e.g., in a table as presented in Table 2, in the processor 110 memory. Additionally, the processor may be programmed to store the geometrical properties of the visual feature. Thus, advantageously, if the camera 100 moves, the processor 110 may be programmed to detect the visual feature based on the stored geometrical properties of the visual feature and adjust the stored table, as discussed above.

Following the block 530, the process 500 ends, or alternatively returns to the decision block 510, although not shown in FIG. 5.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
receive an image from a stationary camera;
based on location coordinates specified for the image, determine location coordinates of an object identified in the image, wherein the location coordinates specified for the image are associated with a visual feature in the received image that includes a calibration sign, wherein the calibration sign is a portable sign and the calibration sign further includes a GPS sensor and a second processor programmed to transmit the location coordinates of the calibration sign based on data received from the GPS sensor of the calibration sign;

receive geometrical properties of the visual feature and location coordinates of the visual feature;

detect the visual feature in the received camera image based on the received geometrical properties;

specify location coordinates for the image by associating the received location coordinates to a projection point of the visual feature in the received image; and based on the object location coordinates, operate a vehicle.

2. The system of claim 1, wherein the instructions further include instructions to determine the object location coordinates based on stored location coordinates of each of a plurality of reference points in the image.

3. The system of claim 2, wherein the instructions further include instructions to:

determine the object location coordinates by identifying one or more projection points in the image associated with the object; and determine the object location coordinates based on the stored location coordinates.

4. The system of claim 1, wherein the instructions further include instructions to:

upon determining that a projection point in the image associated with a reference location has moved, adjust predetermined location coordinates of the reference location; and determine the object location coordinates based on the adjusted location coordinates of the reference location.

5. The system of claim 1, wherein the instructions further include instructions to determine the location coordinates specified for the image based on a camera location and an orientation of the camera.

6. The system of claim 1, wherein the instructions further include instructions to determine at least one of a trajectory and a speed of the object based on the received camera image.

7. The system of claim 1, wherein instructions further include instructions to operate the vehicle by actuating a vehicle brake actuator based on the location coordinates of the detected object and a trajectory of the vehicle.

8. A method, comprising:

receiving an image from a stationary camera;

based on location coordinates specified for the image, determining location coordinates of an object identified in the image, wherein the location coordinates specified for the image are associated with a visual feature in the received image that includes a calibration sign, wherein the calibration sign is a portable sign and the calibration sign further includes a GPS sensor and a second processor programmed to transmit the location coordinates of the calibration sign based on data received from the GPS sensor of the calibration sign;

receive geometrical properties of the visual feature and location coordinates of the visual feature;

detect the visual feature in the received camera image based on the received geometrical properties;

specify location coordinates for the image by associating the received location coordinates to a projection point of the visual feature in the received image; and based on the object location coordinates, operating a vehicle.

9. The method of claim 8, further comprising determining the object location coordinates based on stored location coordinates of each of a plurality of reference points in the image.

10. The method of claim 9, further comprising:

determining the object location coordinates by identifying one or more projection points in the image associated with the object; and determining the object location coordinates based on the stored location coordinates.

11. The method of claim 8, further comprising:

upon determining that a projection point in the image associated with a reference location has moved, adjusting the predetermined location coordinates of the reference location; and determining the object location coordinates based on the adjusted location coordinates of the reference location.

12. The method of claim 8, further comprising determining the location coordinates specified for the image based on a camera location and an orientation of the camera.

13. The method of claim 8, further comprising determining at least one of a trajectory and a speed of the object based on the received camera image.

14. The method of claim 8, further comprising performing the vehicle operation by actuating a vehicle brake actuator based on the location coordinates of the detected object and a trajectory of the vehicle.

* * * * *